United States Patent [19]

Miller et al.

[11] Patent Number: 5,920,158
[45] Date of Patent: Jul. 6, 1999

[54] MULTI-FUNCTIONAL VEHICLE APPARATUS

[76] Inventors: Robin Mihekun Miller, 108 Burbank Rd., Ellington, Conn. 06029; Daniel D. Kilker, 3008 Wheatland Ter., Freeport, Ill. 61032; Monte L. Falcoff, 16221 Beechwood Ave., Beverly Hills, Mich. 48025; H. Winston Maue, 21789 Glenwild Dr., Farmintong Hills, Mich. 48167; Eric J. Krupp, 7695 Ridge Rd., Canton, Mich. 48187; William C. Zimmer, 151 Anna Dr., Columbus, Miss. 39702; James W. Gibson, 5476 Highway 50 East, Steens, Miss. 39766

[21] Appl. No.: 08/947,973

[22] Filed: Oct. 9, 1997

Related U.S. Application Data

[63] Continuation-in-part of application No. 08/430,388, Apr. 28, 1995, abandoned, and a continuation-in-part of application No. 08/431,148, Apr. 28, 1995, Pat. No. 5,694,812.

[51] Int. Cl.⁶ .................................................. H02K 7/14
[52] U.S. Cl. .................. 318/4; 318/9; 318/445; 49/502; 15/250.001; 70/237
[58] Field of Search .................... 318/4, 3, 9–15, 318/270–287, 445; 49/501, 502; 15/250.001, 250.48; 70/237–251; 292/240, 242, 197

[56] References Cited

U.S. PATENT DOCUMENTS

| 2,271,207 | 1/1942 | Rhein . |
| 2,345,778 | 4/1944 | Lammeren et al. . |

(List continued on next page.)

FOREIGN PATENT DOCUMENTS

| 0 345 002 A2 | 6/1989 | European Pat. Off. . |
| 1281424 | 12/1961 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 6/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

Patent Abstracts of Japan, vol. 016, 7–438 (M–1309), Sep. 11, 1992 for JP Patent Publication No. 04151351.
P. 100, *Machine Design*, 60 (1988) Oct. 13, No. 24, Cleveland, Ohio, US.
"Goodheart–Wilcox Automotive Encyclopedia", William K. Toboldt, Larry Johnson, Steven W. Olive, 1989, pp. 723–727.
"Automotive Handbook", Bosch 3rd Edition, 1993, pp. 694–697.
"Kinematic Analysis of Mechanisms", 1959, J.E. Shigley, pp. 228–231.
"Genevamation Indexing Drives", Jan. 12, 1995 Catalog No. 693, Geneva Mechanisms Corporation.
"Saab 900 Owners Workshop Manual", Haynes Publishing Group, 1979 through 1985, pp. 172–174, 237.
Machine Design, "Basics of Design Engineering", Jun. 1992, Article "Mechanical Systems".
A paper from the Third Conference on Mechanisms, "A Survey of Intermittent–Motion", F.J. Bogardus, 1956, pp. 8–15.

(List continued on next page.)

*Primary Examiner*—Brian Sircus

[57] ABSTRACT

A multi-functional automotive vehicle apparatus comprising: a rotatable member; an electromagnetic device operable to selectively rotate said rotatable member; a first motion transmitting member selectively moved in response to rotation of said rotatable member; and a second motion transmitting member selectively moved in response to rotation of said rotatable member.

32 Claims, 16 Drawing Sheets

5,920,158
Page 2

U.S. PATENT DOCUMENTS

| | | |
|---|---|---|
| 2,615,945 | 10/1952 | Jaeschke . |
| 2,659,237 | 11/1953 | Wood . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,552,836 | 1/1971 | Oskam . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,101,206 | 7/1978 | Oskam et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke et al. . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,693,571 | 9/1987 | Kimura et al. . |
| 4,701,972 | 10/1987 | Saito . |
| 4,702,117 | 10/1987 | Tsutsumi et al. . |
| 4,724,760 | 2/1988 | Bubley . |
| 4,733,147 | 3/1988 | Muller et al. . |
| 4,793,640 | 12/1988 | Stewart, Sr. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint et al. . |
| 5,363,246 | 11/1994 | Perry et al. . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,618,069 | 4/1997 | Konchan et al. . |
| 5,634,677 | 6/1997 | Buscher et al. . |
| 5,669,181 | 9/1997 | Kollar et al. . |
| 5,691,586 | 11/1997 | Yonnet et al. . |
| 5,694,812 | 12/1997 | Maue et al. . |
| 5,844,382 | 12/1998 | Dan . |

OTHER PUBLICATIONS

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb. 1996, H. Winston Maue, pp. 73–76.

MULTI-FUNCTIONAL VEHICLE APPARATUS

CROSS REFERENCE TO RELATED APPLICATIONS

This application is a continuation-in-part of U.S. patent application Ser. No. 08/430,388, filed Apr. 28, 1995, now abandoned, and U.S. application Ser. No. 08/431,148, filed Apr. 28, 1995, now U.S. Pat. No. 5,694,812, both of which are incorporated by reference.

BACKGROUND OF THE INVENTION

The present invention relates generally to multi-function actuators and specifically to a multi-functional node apparatus employed in an automotive vehicle to actuate remote devices.

Almost all automotive vehicles have systems that are electrically actuated such as mirrors, windshield wipers and door locks. These systems traditionally include separate electric motors and solenoids to actuate each device. The need for such a multiplicity of electromagnetic devices has increased automotive vehicle weight and cost while further proving difficult to package within the often small spaces provided. Not only is the piece cost increased due to this multiplicity of electromagnetic devices, but the assembly cost, part number proliferation and handling costs, electrical wiring costs, objectional motor noise, and failure modes are increased. The present invention seeks to multiplex an electromagnetic device to actuate a plurality of remote vehicle systems, eliminating numerous electromagnetic devices.

SUMMARY OF THE INVENTION

In accordance with the present invention, the preferred embodiment of a multi-functional node apparatus employs various motion mechanisms including an intermittent motion mechanism, a push-pull motion mechanism, and a rotary motion mechanism. An electromagnetic device selectively causes movement of the motion mechanisms thereby moving a mechanical device coupled thereto. In a further aspect of the present invention, a clutch mechanism selectively couples mechanical devices to the various motion mechanisms.

The multi-functional vehicle apparatus of the present invention is advantageous over conventional systems since the present invention combines many different functions in a single apparatus. For example, in one embodiment of the present invention, the multi-function vehicle apparatus replaces the traditional separate front wiper motor, window washer motor, and hood release solenoid. Accordingly, the present invention significantly reduces the piece cost, assembly cost, part proliferation and handling costs, wiring costs, and battery current consumption as compared to conventional constructions. Furthermore, the multi-functional vehicle apparatus of the present invention significantly reduces weight and packaging space requirements while increasing the electrical and mechanical reliability of the affected systems. Objectional motor and solenoid noises are also reduced. Moreover, the present invention provides a means for mechanically locking the intermittent motion mechanisms and devices coupled thereto in fixed positions. Additional advantages and features of the present invention will become apparent from the following description and appended claims, taken in conjunction with the accompanying drawings.

DETAILED DESCRIPTION OF THE PREFERRED EMBODIMENT

Figure 1:
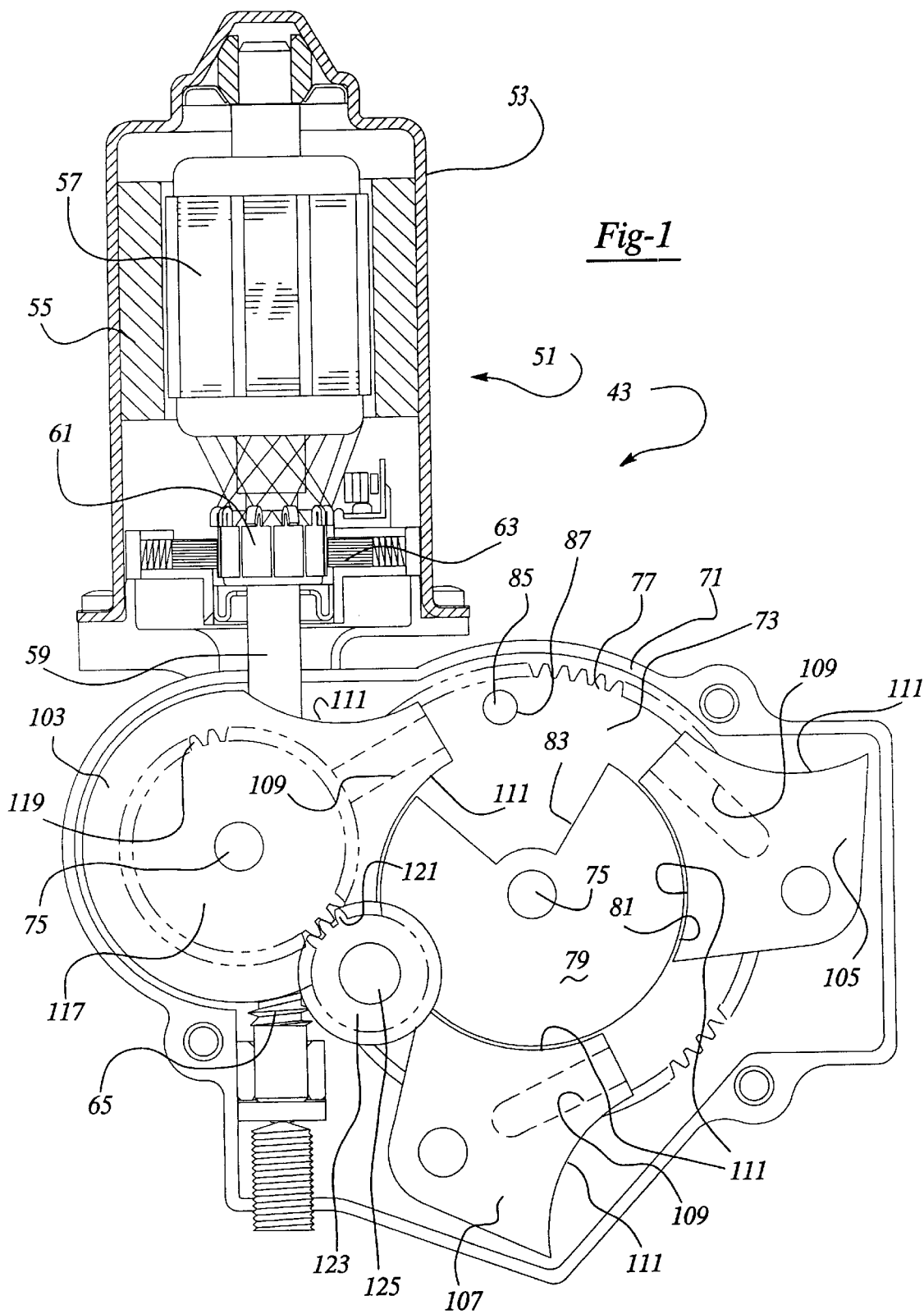
FIG. 1 is a rear elevational view, with portions broken away therefrom, showing a first embodiment of the multi-functional apparatus of the present invention.
Figure 2:
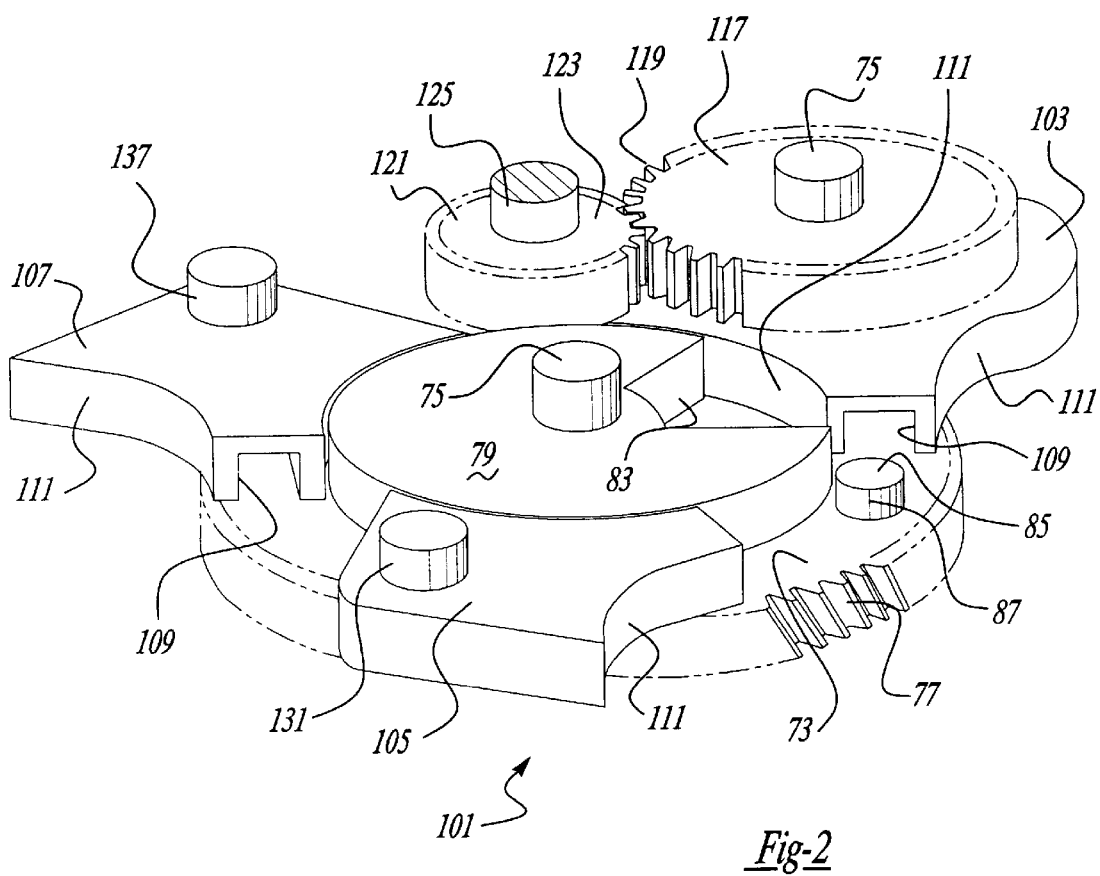
FIG. 2 is a perspective view showing a power transmission assembly employed in the first preferred embodiment of the multi-functional apparatus of the present invention.
Figure 3:
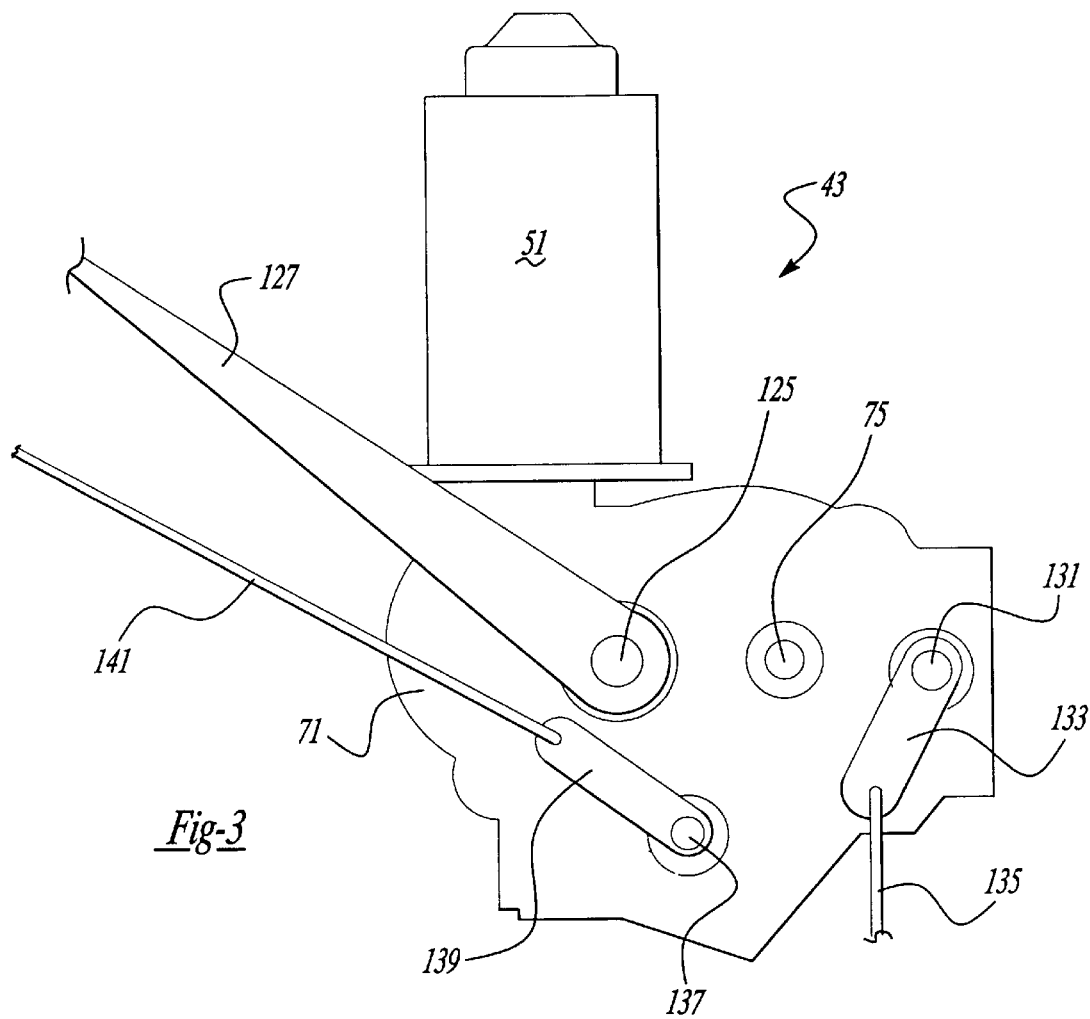
FIG. 3 is a fragmentary rear elevational view showing the first preferred embodiment of the multi-functional apparatus of the present invention.

The construction of a first embodiment of a central drive and power transmission unit 43 is best illustrated in FIGS. 1–3. An electric motor 51 is of a conventional 12 volt fractional horsepower, dc electromagnetic variety having a metallic rotor housing 53 within which are stationary permanent magnets 55, a rotatable armature 57 with wire windings, a rotatable armature shaft 59 joined to armature 57, a commutator 61 electrically connected to the wire windings and rotatable with armature shaft 59, a brush card assembly 63 and various electronic components, bushings and retainers. It will be appreciated to those skilled in the art that other electric motor constructions can readily be substituted for that shown. A worm gear segment 65 is provided upon a portion of armature shaft 59 extending beyond motor housing 53.

A gear housing 71 is also provided for receiving worm gear segment 65 and the immediately adjacent portions of armature shaft 59. A main helical gear 73 is also housed and rotatably journalled within a gear housing 71. Gear housing 71 is preferably made from cast aluminum. A plurality of knurled steel journalling pins 75 are press fit or otherwise attached within machined openings of gear housing 71. This placement of these openings in relation to each other is important. Pins 75 can alternately be molded as part of plastic gears and cams.

Helical gear 73 has an external set of helically oriented teeth 77 projecting entirely therearound for meshing with worm gear segment 65. A drum 79 is mounted upon a face of helical gear 73 for rotating therewith. Drum 79 has a partially circular peripheral surface 81 interrupted by a clearance indentation 83. Drum 79 and helical gear 73 are coaxially aligned for rotation about their respective journalling pin 75. A drive pin 85 projects from a face of helical gear 73 parallel to the adjacent journalling pins 75. Drive pin 85 has a cylindrical driving interface surface 87 thereabout. Of course, a rotatable sleeve may alternately surround drive pin 85. Other alternate driving interface means may be employed such as an integrally molded finger, screw, rivet, spring, rib, plural projections or other similar formations protruding from a face of peripheral portion of helical gear 73. Helical gear 73 is preferably injection molded from a polymeric material such as acetyl. An electrically conductive feedback disk is retained to an inside face of helical gear 73 through ultrasonically rolled welding or insert molding. The feedback disk is comprised of a set of copper alloy or brass alloy stamped contacts which are provided with differing conductive and nonconductive patterns depending on the specific positional ranges as will be discussed in greater detail hereinafter.

A power transmission assembly 101 of central drive and power transmission unit 43 employs three intermittent rotary motion mechanisms or cams 103, 105, 107. Each cam has a single, linear, external open channel 109 defined by driven interfacing surfaces or walls therein. Driving interface surface 87 of drive pin 85 is selectively engagable against the walls defining channels 109 of each cam. Each cam is rotatable about its respective journalling pin 75. Furthermore, partially circular external surfaces 111 of each cam register with the partially circular peripheral surface 81 of drum 79. A relatively tight tolerance on these registering surfaces of about 1–2 thousandths of an inch is preferably used. Thus, unless each cam is aligned with indentation 83 of drum 79, partially circular peripheral surface 81 of drum 79 will act to prevent rotation of each cam. However, when indentation 83 of drum 79 aligns with an individual cam, concurrently with drive pin 85 engaging within a channel 109 of the same cam, continued rotation of helical gear 73 will cause the selectively coupled cam to rotate therewith. Moreover, the selectively coupled cam will have increased rotational acceleration as drive pin 85 rotates around journalling pin 75 within channel 109. This rotational acceleration, then deceleration, achieves a desirable inertial ramping up and ramping down sinusoidal motion effect such that potentially harmful inertial stresses and cyclical fatigue within the device coupled thereto are avoided. The diameter of drive pin 85 should match channel 109 width within a half a thousandth of an inch.

Figure 13:
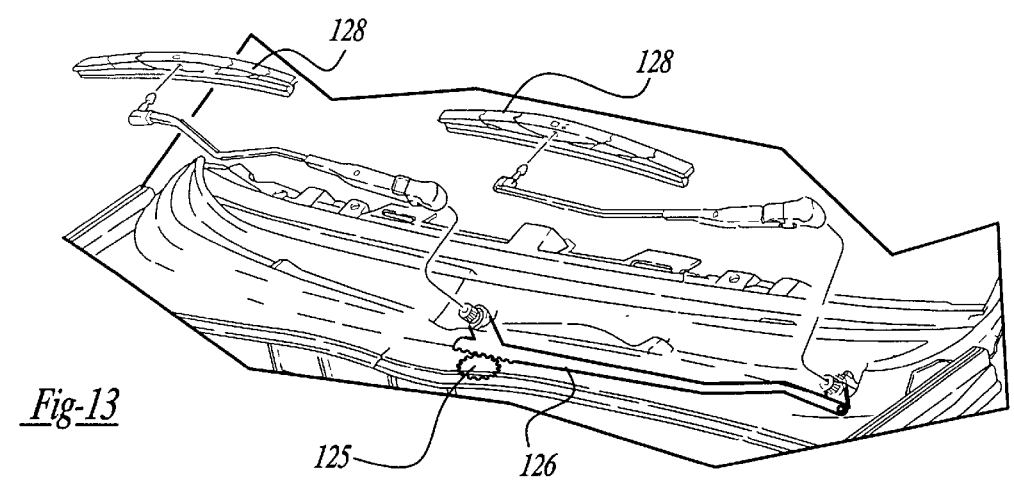
FIG. 13 is a fragmentary and partially exploded perspective view of an automotive vehicle utilizing the various embodiments of the multi-functional apparatus of the present invention to actuate a windshield wiper system.

Cam 103 additionally has a spur gear 117 stacked coaxially thereupon for simultaneous movement therewith. Spur gear 117 has a peripheral set of teeth 119 extending entirely therearound for enmeshing with a mating external set of teeth 121 extending entirely around a driven pinion gear 123. Pinion gear 123 rotates a wiper output shaft 125. The wiper output shaft 125 is coupled to a linkage 126 to drive a pair of front window wipers 128 normally used on most automotive vehicles (see FIG. 13). In the preferred embodiment the wiper output shaft 125 is coupled to the linkage 126 by a rack and pinion assembly. Wiper output shaft 125 is attached to pinion gear 123 through rivets, insert molding, knurled press fitting, et cetera. The wiper output shaft 125 is preferably made from cold rolled steel. The system is designed to oscillate wiper assembly at 45 cycles per minute (round trip) but other cycle frequencies can be achieved.

Figure 12:
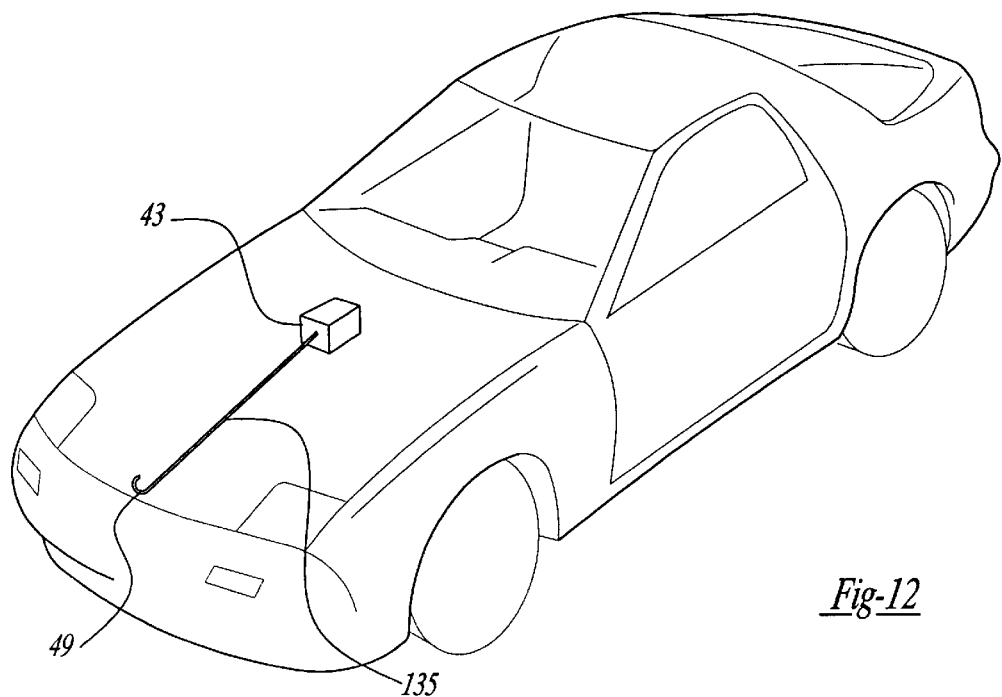
FIG. 12 is a perspective view of an automotive vehicle utilizing the various embodiments of the multi-functional apparatus of the present invention to actuate a hood release latch.

A protuberance 131 projects from a rear face of cam 105 and engages with a lever 133 which, in turn, is attached to a lift lock rod 135. Protuberance 131, lever 133 and rod 135 are also considered to be lock couplings or coupling members. Protuberance 131 and pin 75 are concentric and pin 75 is a bearing surface. Lock connecting rod 135 is joined to hood release 49 (see FIG. 12) for causing the mechanisms therein to move in a push-pull manner in response to the movement of cam 105. As cam 105 moves it will rotate protuberance 131 engaged to lever 133, shifting lever 133. Lever 133 will then actuate connecting rod 135 in a push-pull manner to release hood release 49. Alternately, hood release may consist of a system as disclosed within U.S. Pat. No. 5,618,069 entitled "Hood and Decklid Latch Assemblies" which issued to Konchan et al. on Apr. 8, 1997 which is incorporated by reference herein.

Similarly, a protuberance 137 extends from and moves with a rear face cam of cam 107. A lever 139 is connected to protuberance 137 for moving therewith. A lift release connecting rod 141 connects lever 139 to a washer fluid pump to cause pumping motion which sprays wiper fluid onto the front window of an automotive vehicle. Such a washer fluid pump is disclosed within the following U.S. Pat. Nos. 4,173,055 entitled "Windshield Washer Pump Drive Mechanism" which issued to Izumi et al. on Nov. 6, 1979; and 3,574,882 entitled "Windshield Washer Pump Assembly" which issued to Petry on Apr. 13, 1971; both of which are incorporated by reference herewithin. Protuberance 137, lever 139 and connecting rod 141 are also defined as coupling members. Protuberances 131 and 137 are preferably secured to their respective levers 133 and 139 in a keyholed manner. Additional threaded nuts, push nuts, crimpings, cotter pins and washers or the like (not shown) may be employed to retain the levers to their protrusions. The cams, spur gear and pinion gear are preferably made from powdered metallic steel. Alternately, other coupling means may be employed such as cables, belts, chains, gear sets, multiple linkages, jack screws, rack and pinion gear sets or the like.

Figure 4:
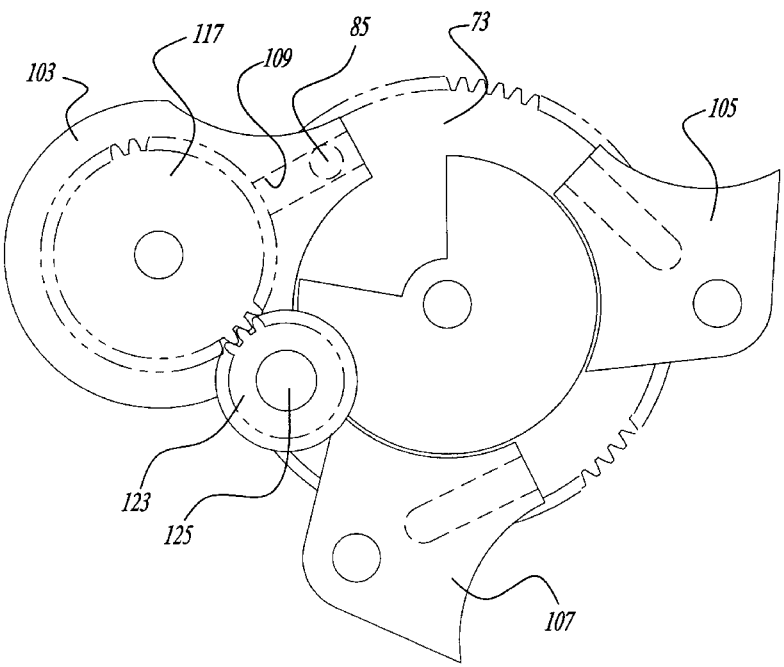
FIG. 4 is a diagrammatic rear view showing the power transmission assembly mechanisms of the first preferred embodiment of the multi-functional apparatus of the present invention in the beginning of a rotary motion.
Figure 5:
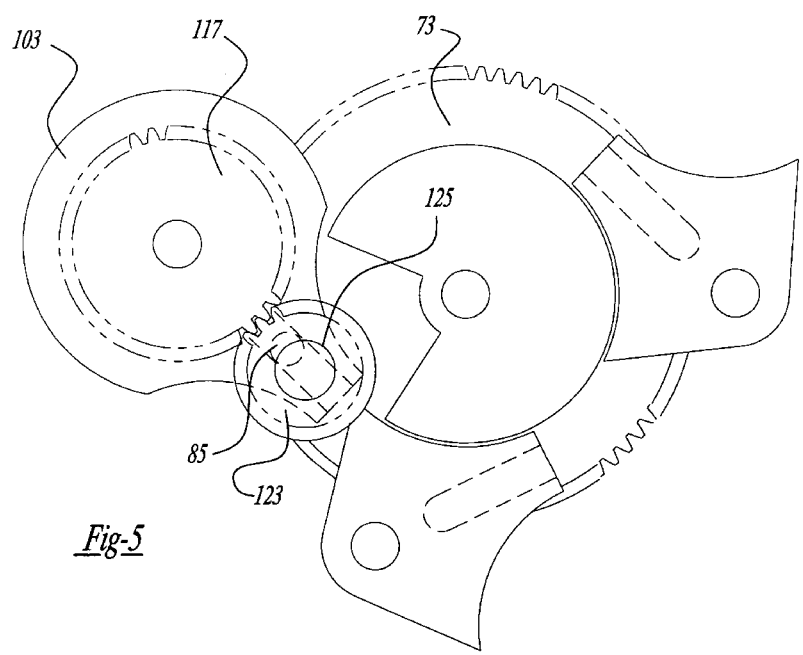
FIG. 5 is a diagrammatic rear view showing the power transmission assembly of the first preferred embodiment of the multi-functional apparatus of the present invention at the end of one direction of a rotary motion.
Figure 6:
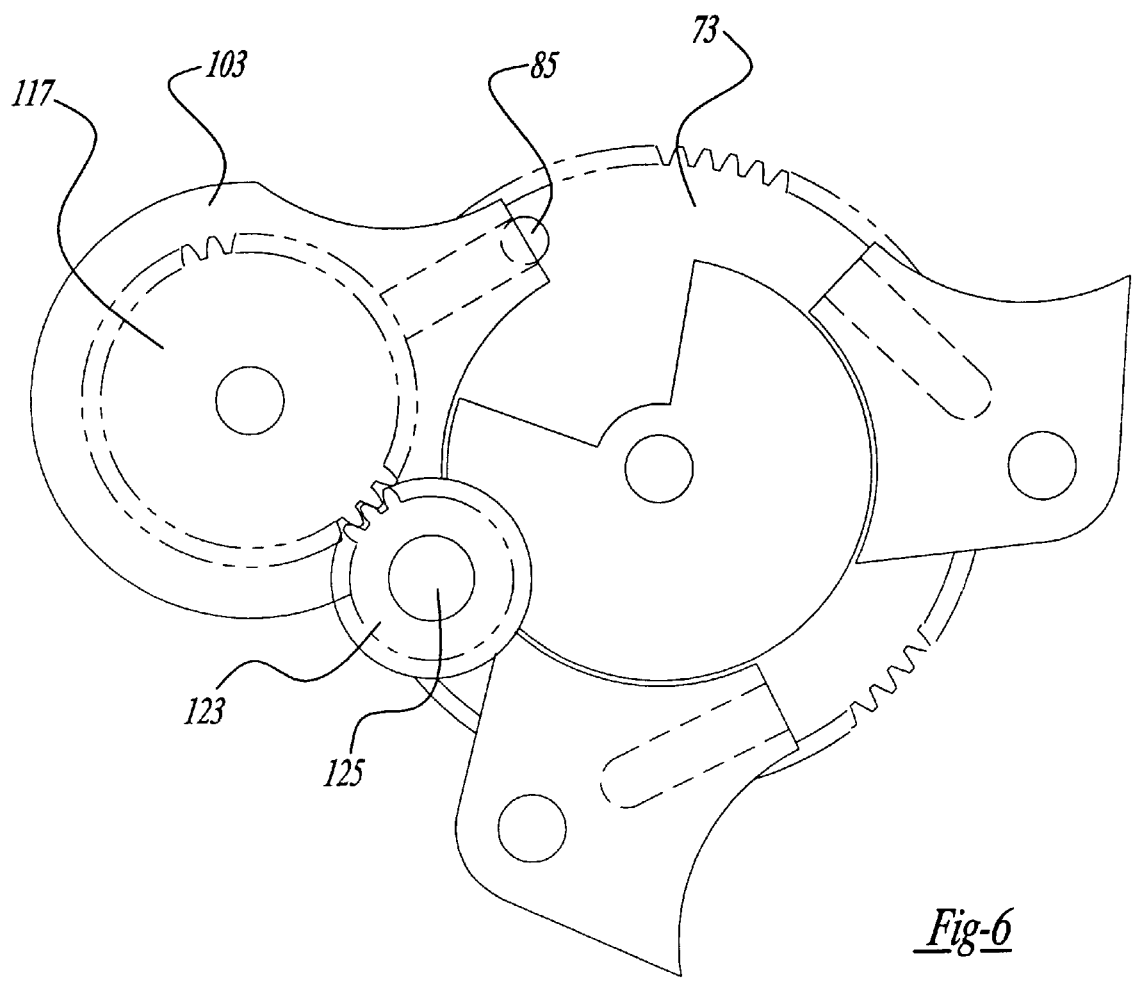
FIG. 6 is a diagrammatic rear view showing the power transmission assembly of the first preferred embodiment of the multi-functional apparatus of the present invention at the end of a rotary motion.

The operation of the multi-functional apparatus of the present invention can best be understood by referring to FIGS. 4–10. In FIG. 4, drive pin 85 has partially entered channel 109 of cam 103. FIG. 5 shows helical gear 73, drive pin 85, cam 103, spur gear 117 and pinion gear 123 rotated 162 degrees to the completion position at the end of the window wipe range. The electrical polarity is then reversed to motor 1 (see FIG. 1) such that rotation of helical gear 73, drive pin 85, cam 103, spur gear 117, pinion gear 123 and wiper shaft 125 are reversed. Referring to FIG. 6, helical gear 73 is rotated such that drive pin 85 moves cam 103, spur gear 117, pinion gear 123, wiper shaft 125 and wiper assembly 45 to the depressed wiper parking position. Before the wiper is parked one full wiping cycle will occur.

Figure 7:
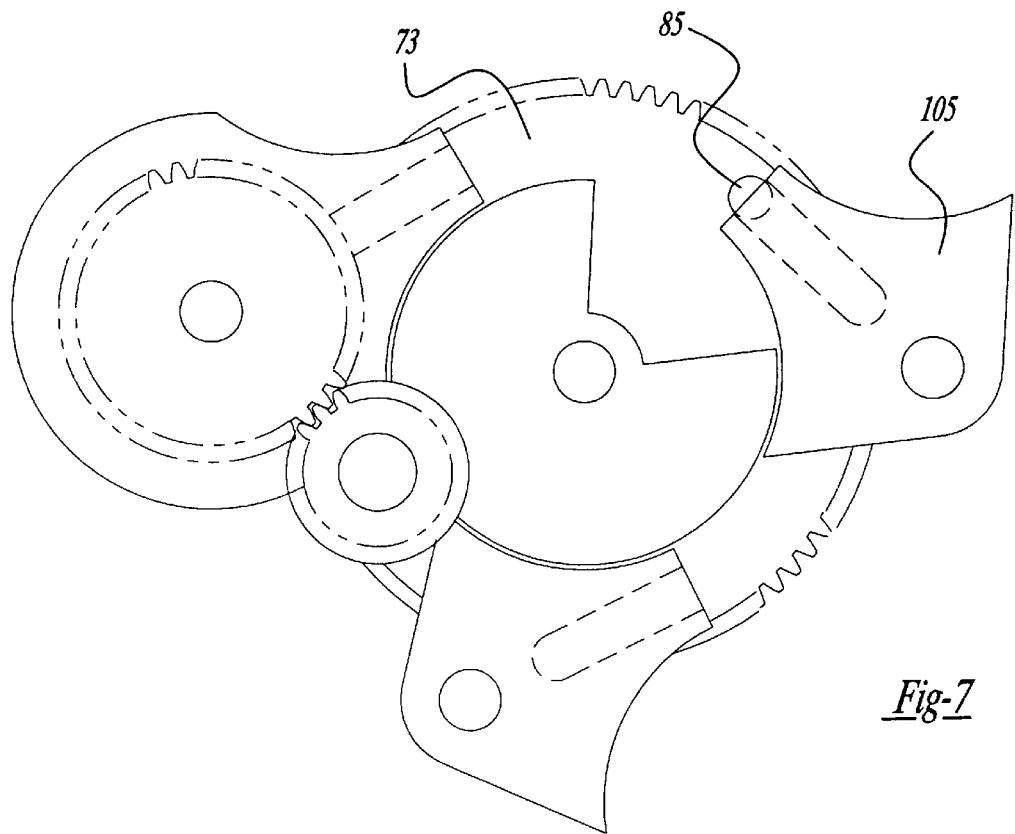
FIG. 7 is a diagrammatic rear view showing the power transmission assembly of the first preferred embodiment of the multi-functional apparatus of the present invention at the beginning of a push-pull motion.
Figure 8:
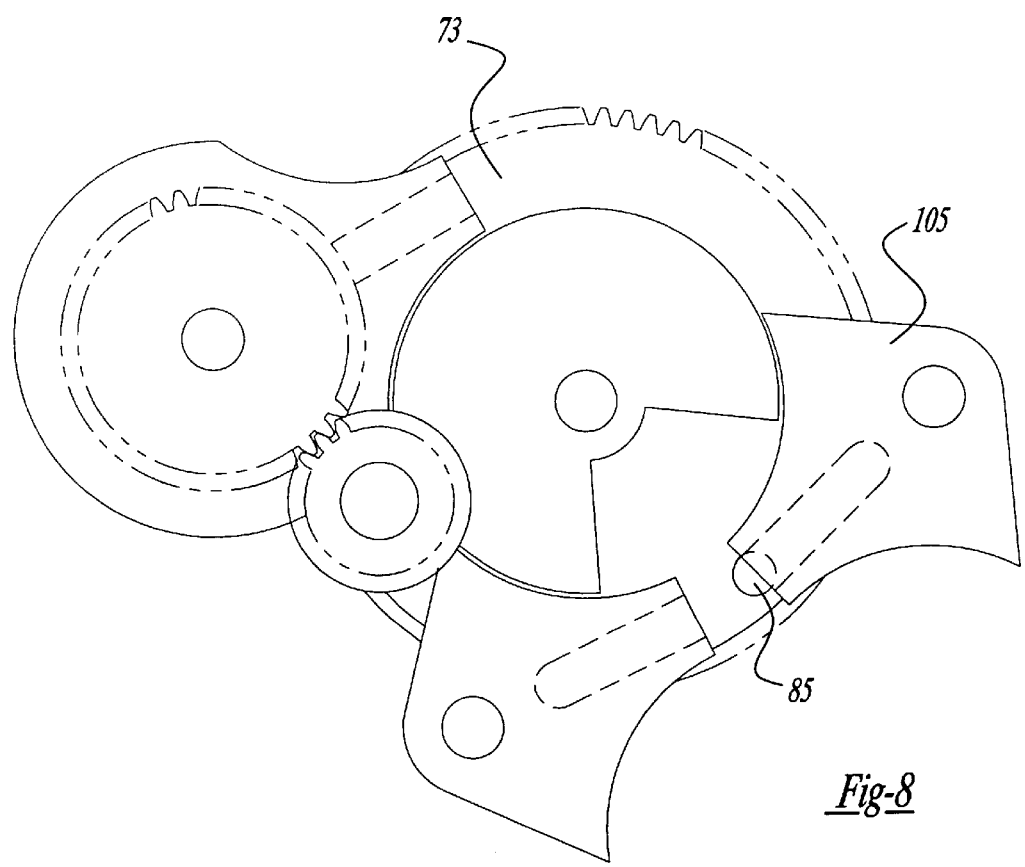
FIG. 8 is a diagrammatic rear view showing the power transmission assembly of the first preferred embodiment of the multi-functional apparatus of the present invention at the completion of a push-pull motion.

FIG. 7 illustrates helical gear 73 and drive pin 85 moved to the beginning of a hood latch release positional range. Subsequently, FIG. 8 shows helical gear 73 and drive pin 85 rotated to the completion of the hood latch release. Clockwise movement (as illustrated) of helical gear 73 causes cam 105 to move from a locked orientation to an unlocked orientation thereby causing the couplings and hood latch release 49 (see FIG. 12) associated therewith to also be moved from a coupled position to an uncoupled position. Motor 51 (see FIG. 1) can then be reversed to move helical gear 73 in a counterclockwise direction (as illustrated); this causes drive pin 85, cam 105, the couplings and hood release (see FIG. 12) to move from a coupled position to an uncoupled position.

Figure 9:
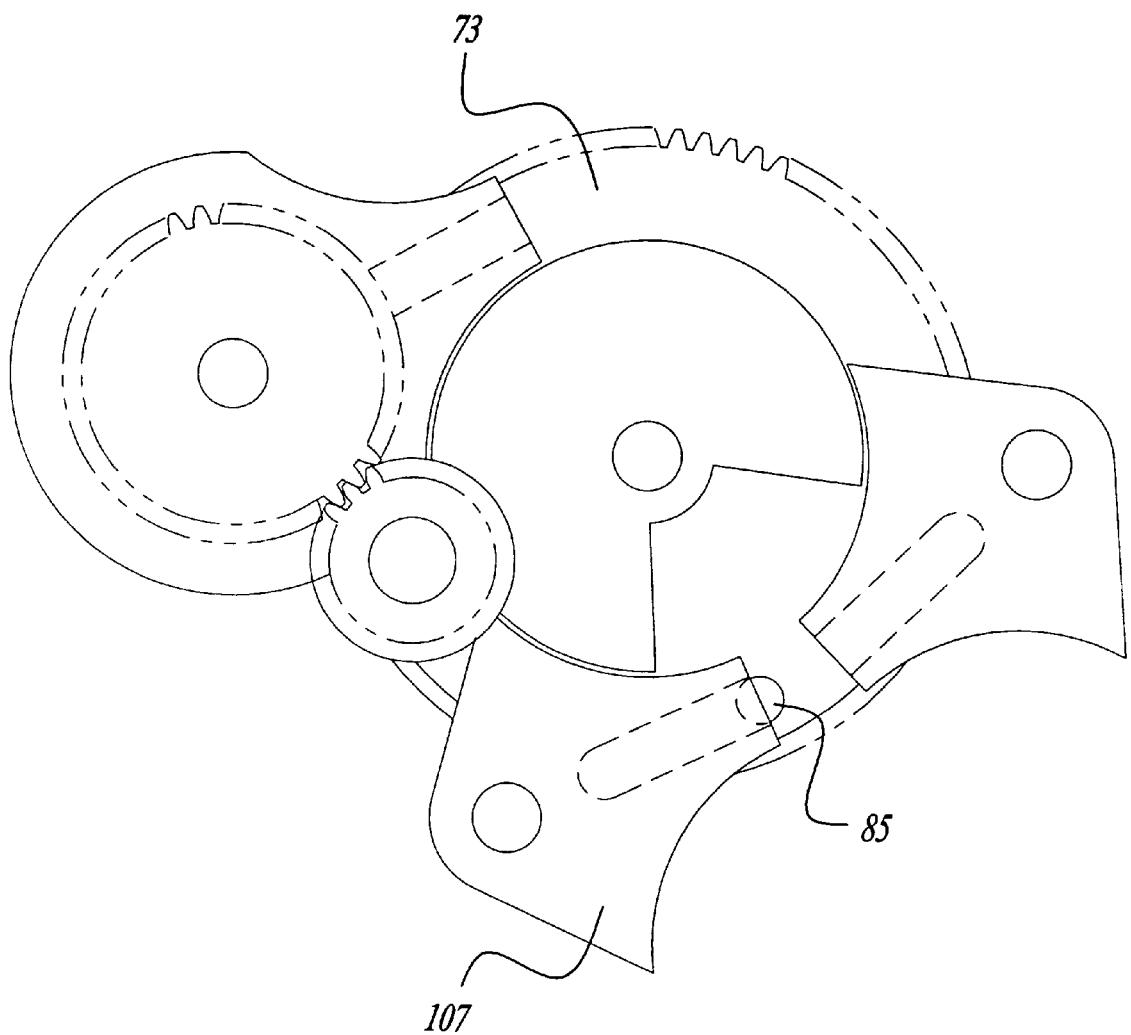
FIG. 9 is a diagrammatic rear view showing the power transmission assembly of the first preferred embodiment of the multi-functional apparatus of the present invention at the beginning of a push-pull motion.
Figure 10:
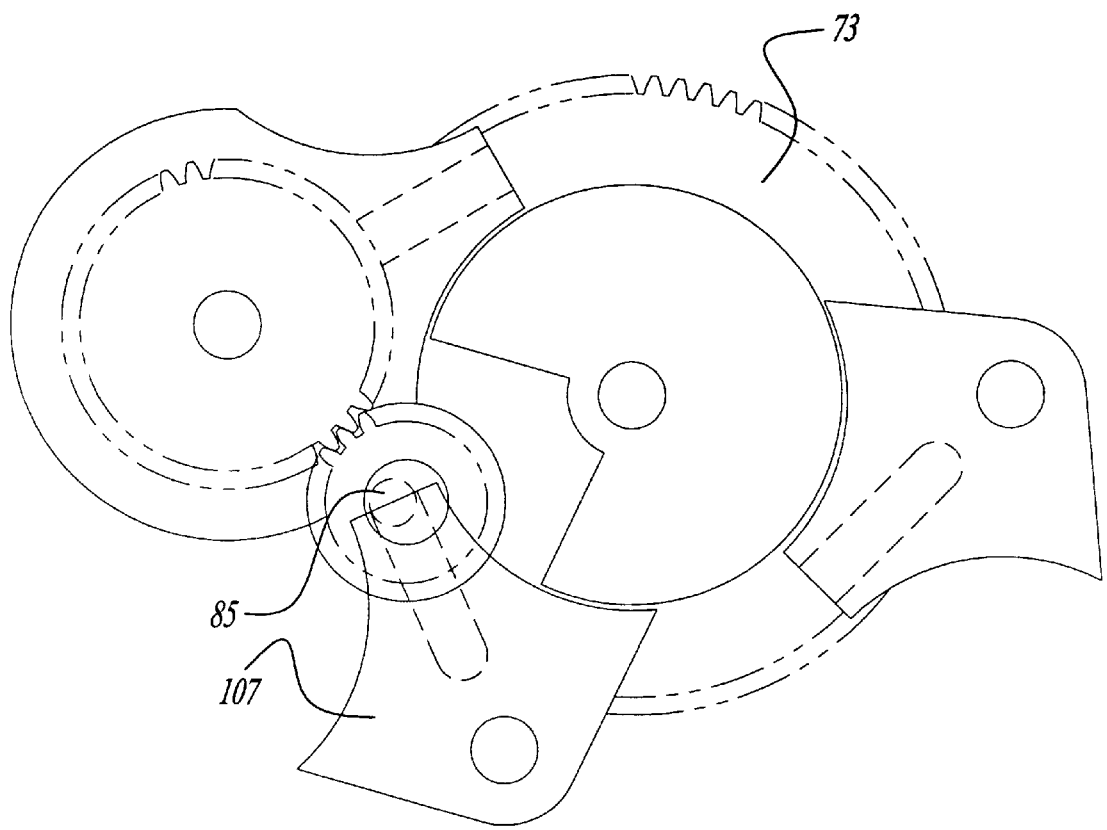
FIG. 10 is a diagrammatic rear view showing the power transmission assembly of the first preferred embodiment of the multi-functional apparatus of the present invention at the completion of a push-pull motion.

In FIG. 9, helical gear 73 and drive pin 85 are shown rotated to the beginning of a washer fluid pump pumping range. In this position, drive pin 85 engages cam 107. Helical gear 73, drive pin 85 and cam 107 are then rotated to the completion of the washer fluid pump pumping range as is shown in FIG. 10. This causes the couplings and washer fluid pump to spray wiper fluid from reservoir onto the front window of an automotive vehicle.

Figure 15:
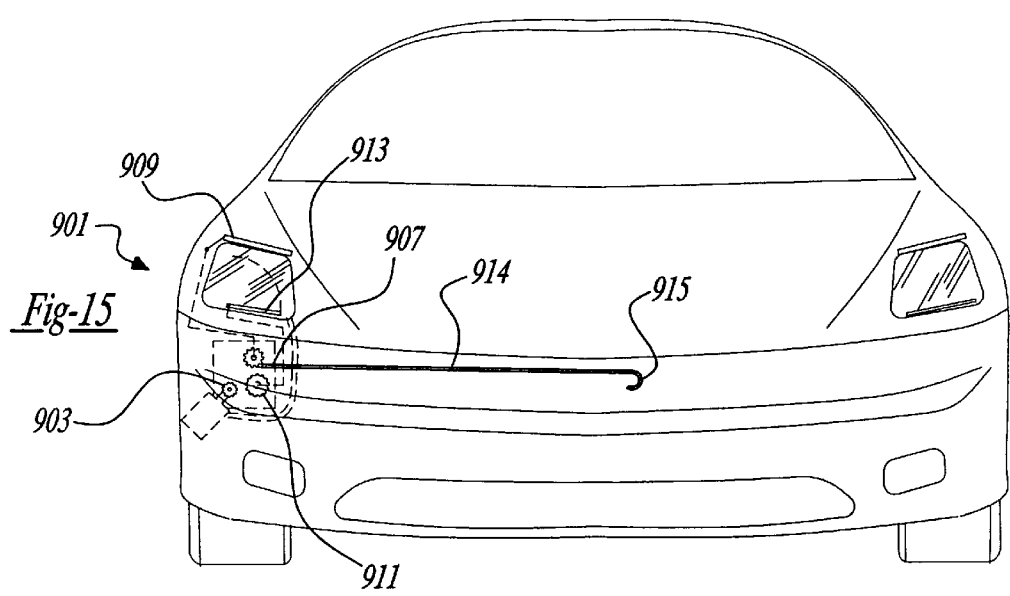
FIG. 15 is a diagrammatic front view showing a head lamp and hood release system employing the various embodiments of the multi-functional apparatus of the present invention.

A second embodiment of the present invention is shown in FIG. 15. This second embodiment of the present invention employs the drive and power transmission unit 43 like that of the preferred embodiment to selectively drive an output gear 903 which operates a headlamp washer fluid pump. Such a washer pump has been disclosed previously. A second motion mechanism selectively drives a second output gear 907 which moves a headlamp mechanism 909. Such a headlamp mechanism can comprise a rotatable headlamp cover having a pivoting cammed surface with gear teeth thereon. Alternately, the headlamp mechanism may consist of a retractable headlamp and bracket assembly such as those disclosed within U.S. Pat. Nos. 5,355,286 entitled "Retractable Headlamp Assembly" which issued to Flint et al. on Oct. 11, 1994; and 5,251,114 entitled "Actuator for Controlling the Orientation of a Motor Vehicle Headlamp" which issued to Cantin et al. on Oct. 5, 1993; both of which are incorporated by reference herewithin. A third motion mechanism selectively drives a third output gear 911. This output gear 911 serves to rotate a headlamp wiper assembly 913 in a cyclically oscillating manner. A fourth motion mechanism is coupled to an output rod 914 which is coupled to a hood latch release mechanism 915. This output rod serves to actuate the hood latch release mechanism 915 in a push-pull manner. A front node electronic control unit controls the actuation of an electric motor to selectively drive the intermittent motion mechanisms. The output gears may need to be of a bevel gear variety due to differently angled devices.

Figure 14:
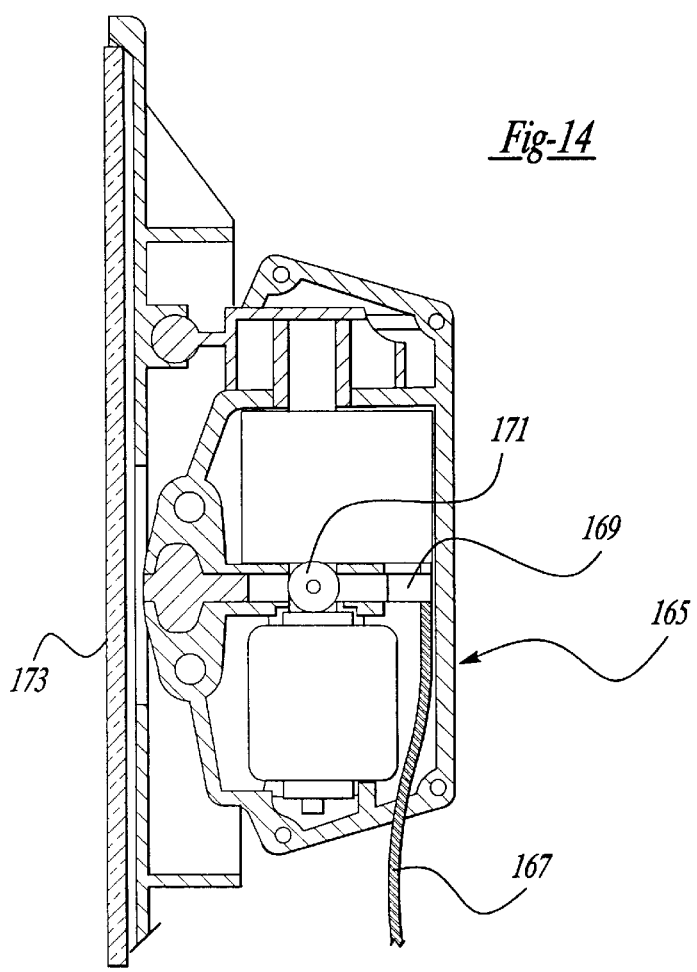
FIG. 14 is a cross sectional view of a power mirror system employing the various embodiments of the multi-functional apparatus of the present invention.
Figure 16:
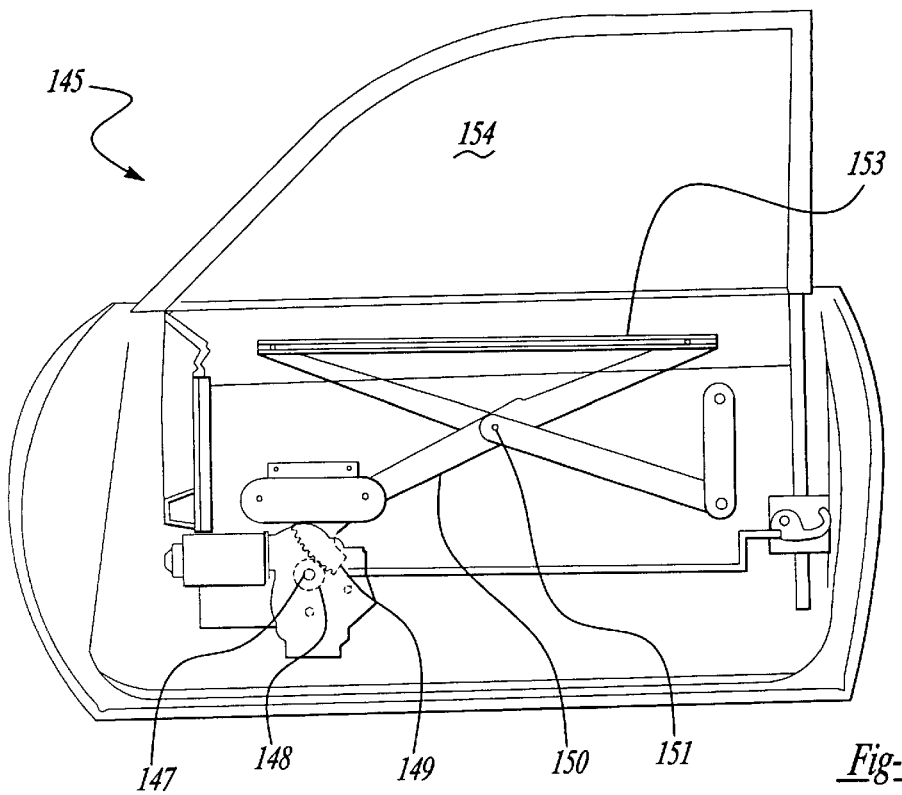
FIG. 16 is a diagrammatic side view of an automotive vehicle door utilizing the various embodiments of the multi-functional apparatus of the present invention to actuate a power window system and door lock.
Figure 17:
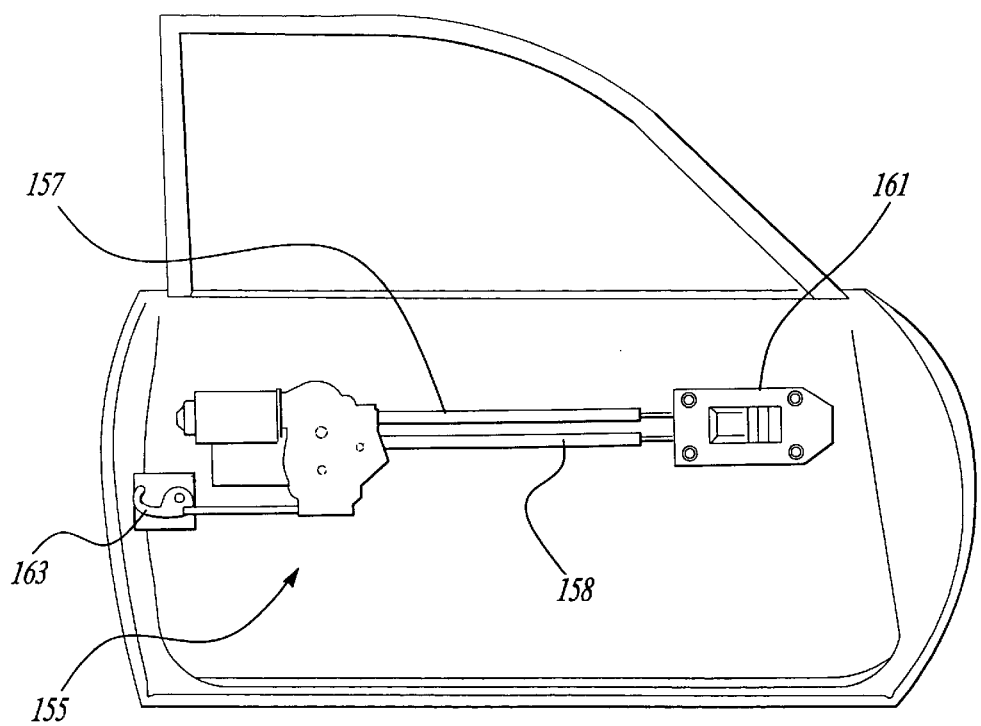
FIG. 17 is a diagrammatic side view of an automotive vehicle door utilizing the various embodiments of the multi-functional apparatus present invention to actuate a power lock system.
Figure 18:
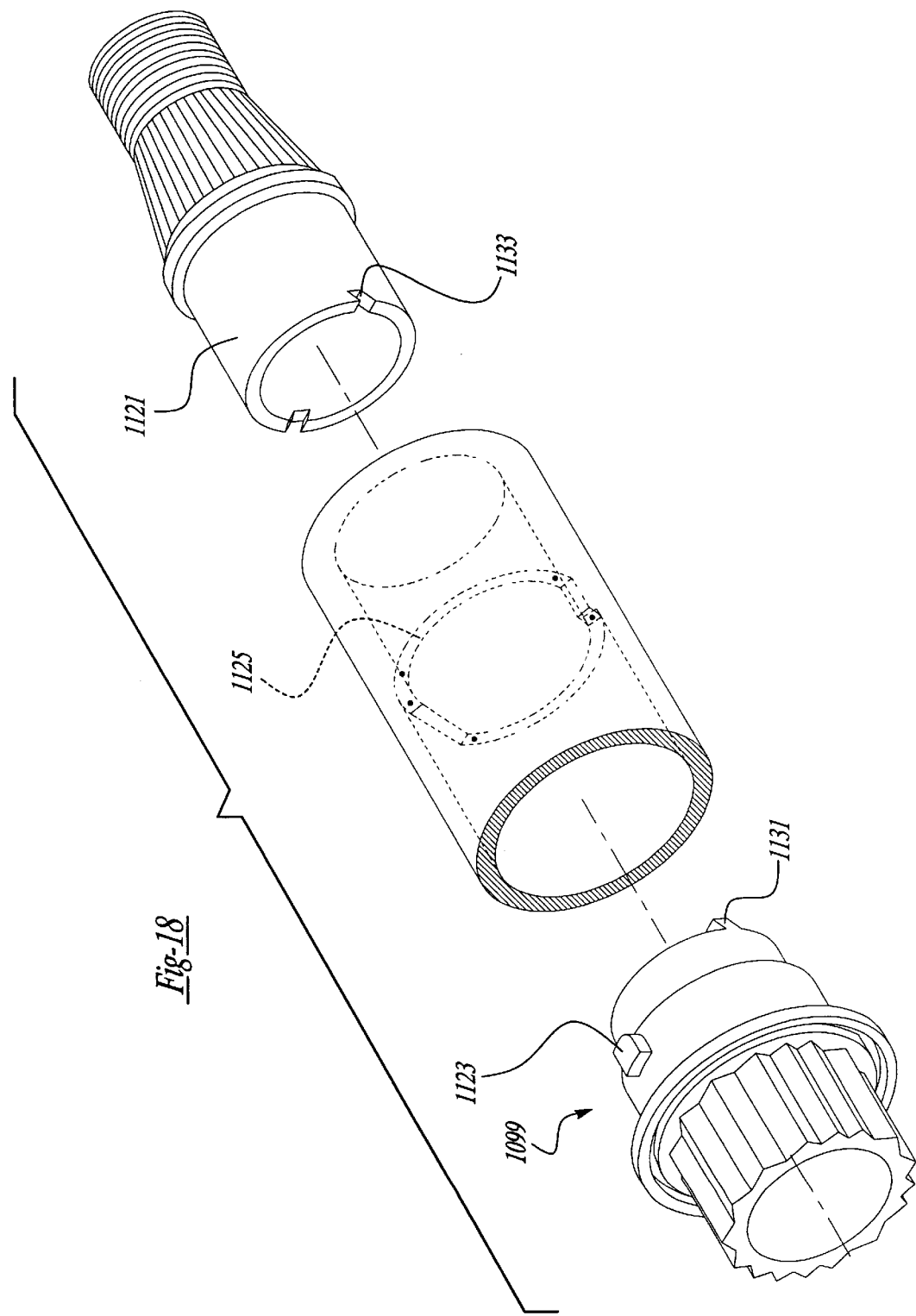
FIG. 18 is an exploded perspective view showing a clutch mechanism of a second preferred embodiment of the multi-functional apparatus of the present invention.

A third embodiment of the present invention is shown in FIGS. 14, 16, and 17. A central drive and power transmission unit 43 (see FIG. 1) as previously disclosed is coupled to a power window lift system 145, power lock system 155 and an exterior power mirror system 165. Cam 103 in this embodiment is coupled to pinion gear 123 which rotates a window regulator shaft 147 coupled to pinion gear 148 whose teeth enmesh geared sector 149. Geared sector 149 is operably coupled to scissors mechanism 150 having pivot 151 and coupled to window support 153. As cam 103 rotates, window regulator shaft 147 will rotate, turning pinion gear 148 which drives geared sector 149. Geared sector 149 will cause scissors mechanism 150 to advance and extend around pivot 151 raising the window support 153. Window support 153 is coupled to window glass 154. Alternately, the power mirror system may consist of a system as disclosed within U.S. Pat. No. 4,101,206 entitled "Adjustable Motor Car Mirror with Compact Electrically Driven Adjusting Means" which issued to Oskam et al. on Jul. 18, 1997 which is incorporated by reference herein.

FIG. 17 illustrates the power locking system 155 of the present invention. The lock rod 135 (see FIG. 3) is coupled to rod 157 which is coupled to manual locking mechanism 161. Locking mechanism 161 is further coupled to rod 158 which actuates rod 159 in a push-pull motion, locking and unlocking latch 163. In other embodiments of the present invention a cable or linkage may be substituted for rods 157, 158, and 159. Alternately, the power locking system may consist of a system as disclosed within U.S. Pat. No. 5,634,677 entitled "Power-Locking Motor-Vehicle Door Latch" which issued to Buscher et al. on Jun. 3, 1997 which is incorporated by reference herein.

FIG. 14 illustrates the power mirror system 165 of the present invention. Connecting rod 141 (see FIG. 3) is coupled to rod 167 which is joined to lever 169. Lever 169 pivots about pivot point 171 and is further connected to mirror and bracket assembly 173. Activation of connecting rod 141 will move rod 167 in a push pull manner. This pushing and pulling of rod 167 will rotate lever 169 about pivot point 171 thereby pivoting or rotating the mirror and bracket assembly 173. In other embodiments of the present invention a cable may be substituted for rod 167. Alternately, the power window system may consist of a system as disclosed within U.S. Pat. No. 5,669,181 entitled "Power Sliding Window Assembly" which issued to Kollar et al. on Sep. 23, 1997 which is incorporated by reference herein. Of course, it will be appreciated that the previously discussed positional ranges may have alternate patterns and arrangements, and may include additional or replacement functions and vehicle systems.

A fourth embodiment of the present invention allows main helical gear 73 to rotate in either a clockwise or counter-clockwise manner in order to actuate the various cams. In this fourth embodiment cam 103 will operate the wiper system as disclosed above and the main helical gear 73 will be rotatable in a counter clockwise fashion to actuate cam 107. Cam 107 in this embodiment may be coupled to any automotive system requiring a push-pull action. Main helical gear 73 will also be rotatable in a clock-wise fashion to actuate cam 105 which may also be coupled to any automotive system requiring a push-pull action.

Figure 11:
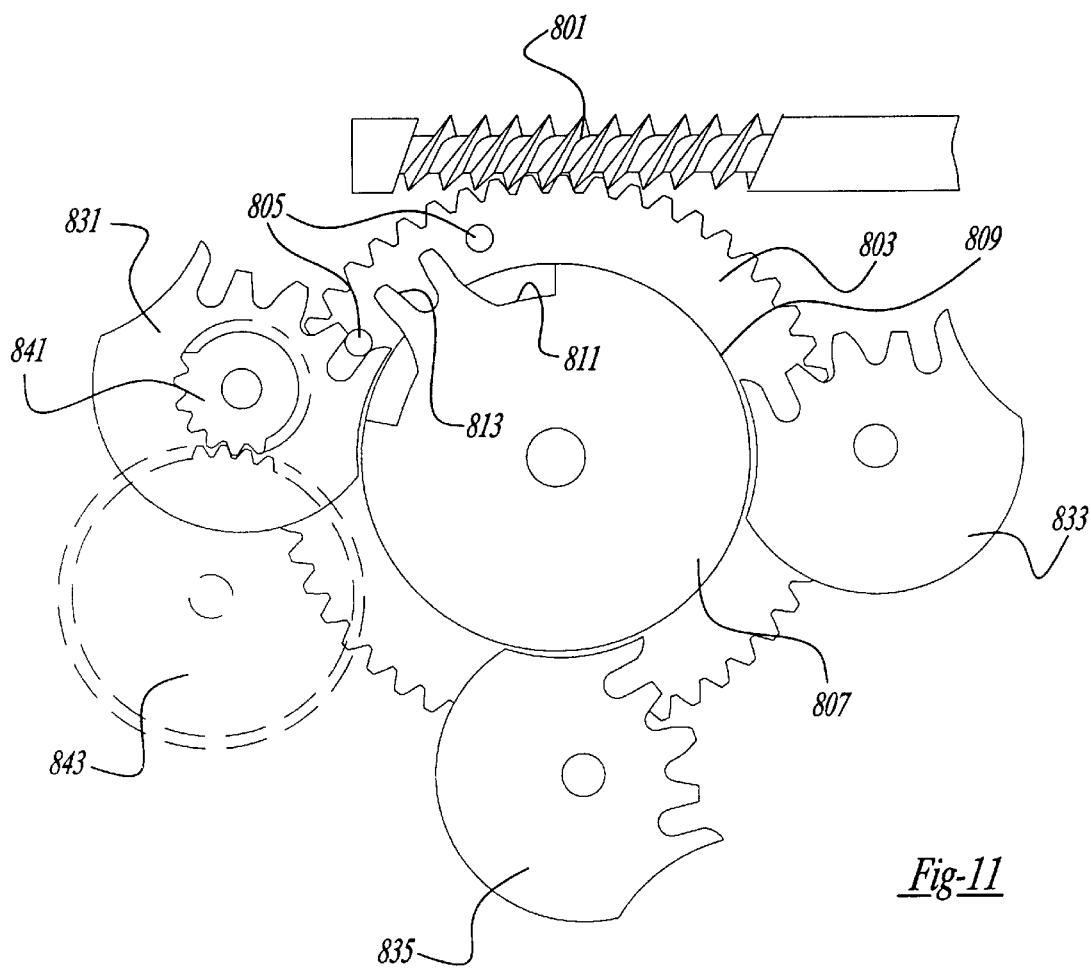
FIG. 11 is a diagrammatic rear elevational view showing an alternate embodiment of the multi-functional apparatus of the present invention.

A fifth embodiment of the multi-functional apparatus of the present invention is partially shown in FIG. 11. In this embodiment, a worm gear segment 801 of a fractional horsepower, dc electric motor armature drives a helical gear 803 enmeshed therewith. A pair of drive pins 805 project from a face of helical gear 803 for rotation therewith. Drum 807 further has a bifurcated fork 813 radially projecting therefrom and extending between the pair of drive pins 805. This embodiment also employs three starwheel mechanisms 831 for rotation therewith. Spur gear 841 is stacked upon starwheel mechanism 831 for rotation therewith. Spur gear 841 rotatably drives a pinion gear 843 which is engaged with a wiper shaft. Drive pins 805 and bifurcated fork 813 can be selectively rotated by the motor to engage with the teeth of the desired starwheel mechanism. Otherwise, this embodiment functions the same as the first embodiment.

Figure 19:
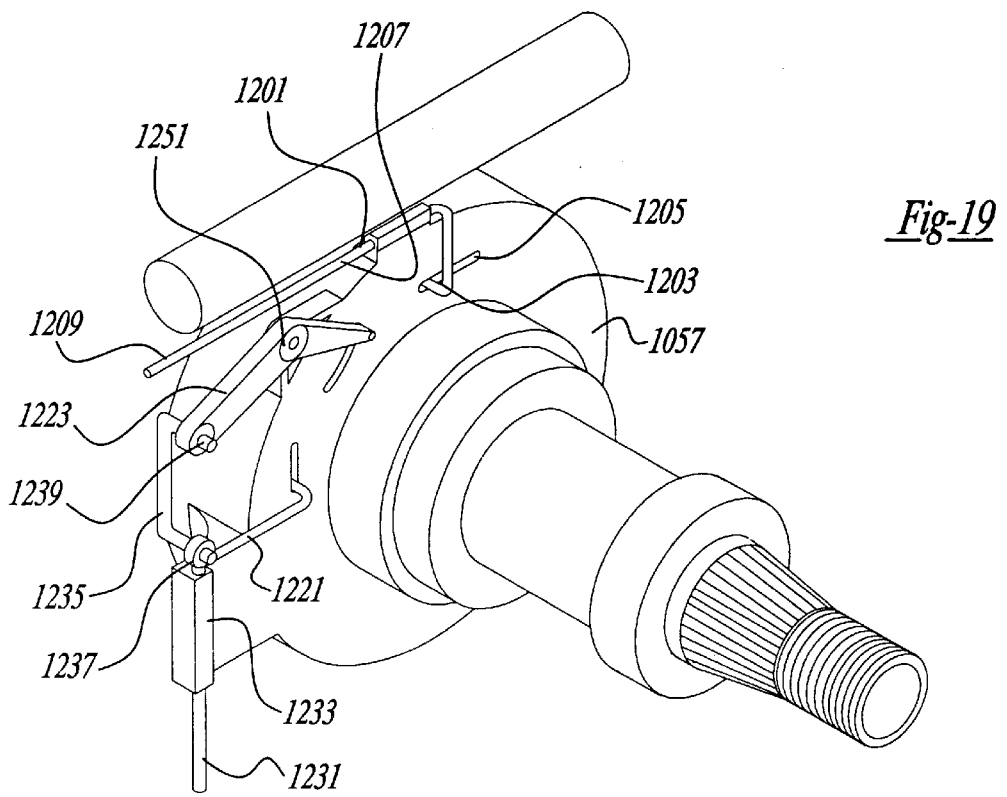
FIG. 19 is a perspective view, with a main gear exploded away therefrom and with an electric motor broken away therefrom, showing a second preferred embodiment of the multi-functional apparatus of the present invention.

In a sixth embodiment of the present invention a central drive and power transmission, as disclosed by U.S. patent application Ser. No. 08/431,148, is utilized to actuate various automotive vehicle systems that are electronically actuated such as mirrors, windshield wipers and door locks. Patent application Ser. No. 08/431,148 discloses a rotary tab and lever system which is able to actuate an intermittent motion mechanism, a push-pull motion mechanism, and a rotary motion mechanism in a fashion similar to the embodiments disclosed previously. Referring to FIG. 19 an intermittent motion mechanism is connected to linkage 1201. Linkage 1201 is constructed from a steel wire. A leading end 1203 of linkage 1201 is bent so as to extend through a slot 1205 in gear housing 1057. Furthermore, a median segment 1207 of linkage 1201 is linearly slidable within a passageway formed through gear housing 1057. A trailing end 1209 of linkage 1201 may be coupled to any vehicle system requiring a push-pull mechanism such as a power lock system, a power mirror system, a washer fluid pump or a hood latch release.

A primary linkage 1221 and secondary linkage 1223 are also coupled to any vehicle system requiring a push-pull mechanism such as a power lock system, a power mirror system, a washer fluid pump or a hood latch release. Primary linkage 1221 is also a bent steel wire having a leading end 1227 protruding within a slot 1229 of gear housing 1057. A median segment 1231 is slidably trapped within a support 1233 extending from gear housing 1057. A C-shaped bent wire 1235 couples an elbow 1237 of primary linkage 1221 to a distal end 1239 of secondary linkage 1223. Secondary linkage 1223 further has a proximal end 1241 with a pin 1243 protruding therefrom which enters an arcuate slot 1245 of gear housing 1057. Secondary linkage 1223 is pivotable about a central fulcrum 1251 mounted to gear housing 1057. Wire 1235 can be pivotally joined to primary and secondary linkages, respectively 1221 and 1223, via bent metal wire clips, polymeric force-fit collars, push nuts or the like. Linkages 1209, 1221 and 1223 may alternately be constructed as pivoting or sliding members, having an infinite variety of shapes, and constructed from plastic, cast metal, powdered metal, bent wire, geared members or the like. It should further be understood that the connecting rods may be substituted by cables, belts, gears, a plurality of mechanical linkages, chains, jackscrews or other force transmitting and coupling means.

Figure 20:
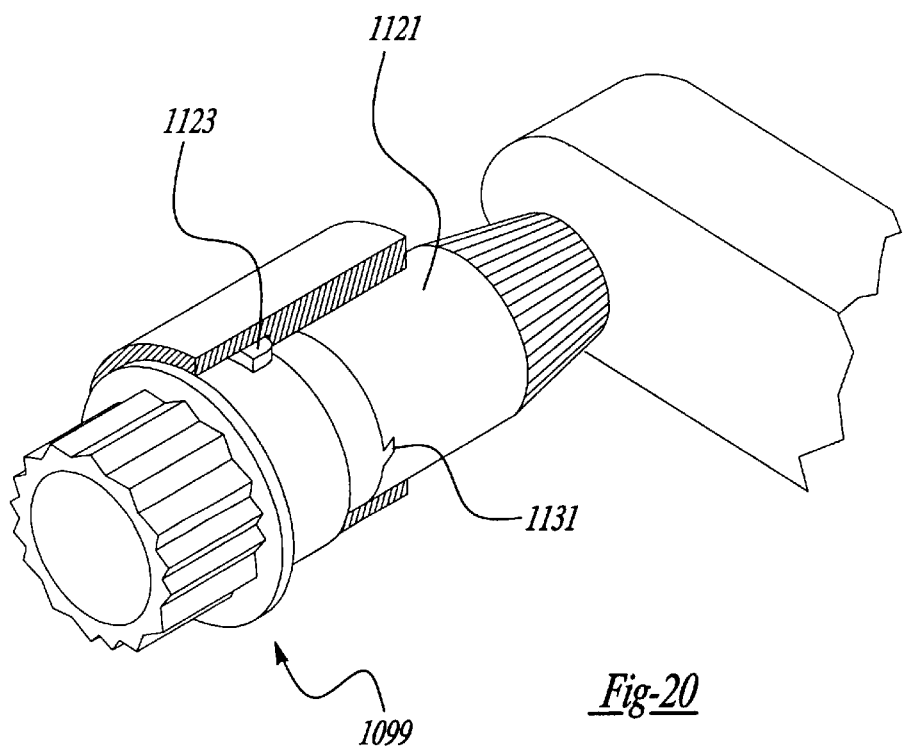
FIG. 20 is a fragmentary perspective view showing the clutch mechanism of the second preferred embodiment of the multi-functional apparatus of the present invention.
Figure 21:
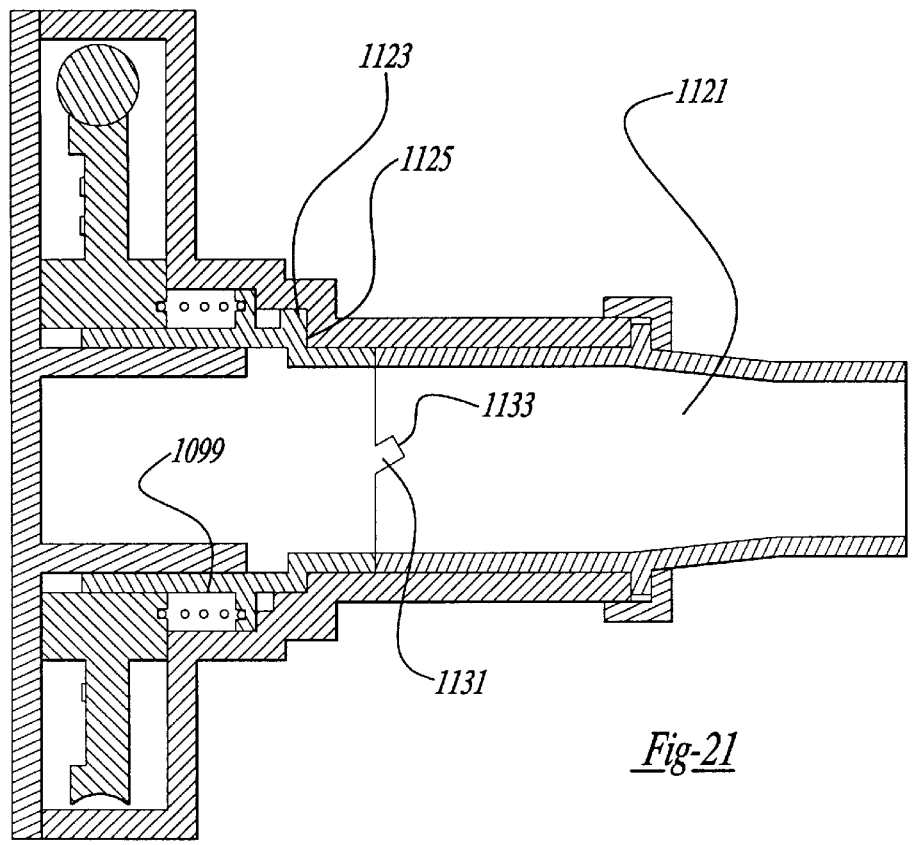
FIG. 21 is a section view showing the second preferred embodiment of the multi-functional apparatus of the present invention with the clutch mechanism in an engaged position.
Figure 22:
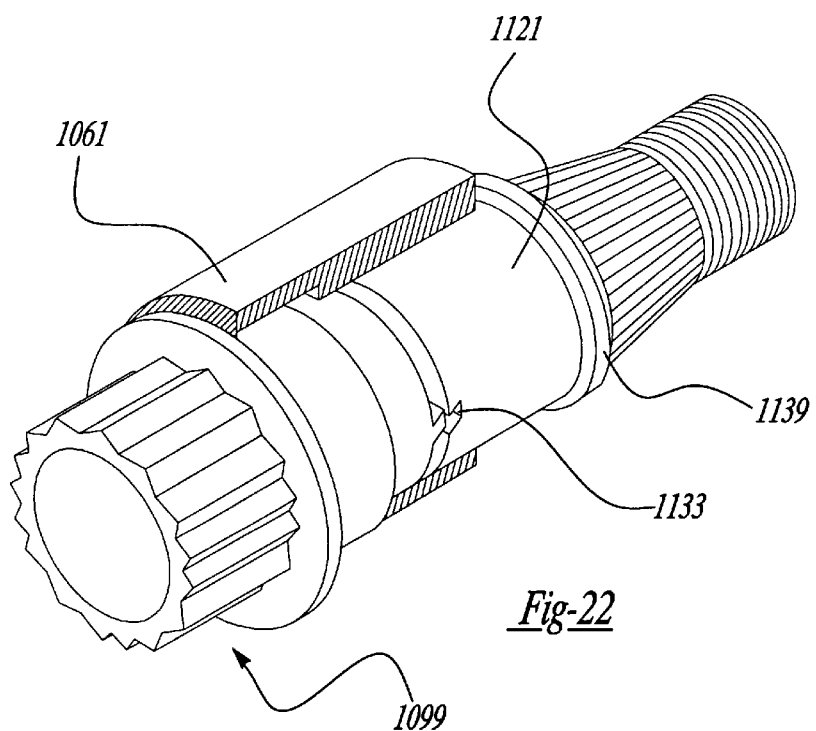
FIG. 22 is a fragmentary perspective view showing the clutch mechanism of the second preferred embodiment of the multi-functional apparatus of the present invention in a disengaged position.

The seventh embodiment of the present invention is equipped with a clutch mechanism to aid in the selective actuation of the various automotive vehicle systems. The operation of one embodiment of the clutch mechanism employed in the present invention is disclosed in U.S. patent application Ser. No. 08/431,148. The operation of the clutch mechanism employed with the present invention can best be understood by referring to FIGS. 18 and 20–22. When a vehicle system requiring a rotary motion is set in operational mode, motor 51 causes spring tab and helical gear to rotate or oscillate. Concurrently therewith, cam follower 1123 of actuator shaft 1099 rides along camming surface 1125. During this rotational or oscillating operation, fingers 1131 of actuator shaft are fully engaged with receptacles in shaft 1121 as is shown in FIGS. 20 and 21. Accordingly shaft 1121 rotates in unison or in conjunction with actuator shaft 1099 and helical gear 1059. An alternate embodiment of the present invention will include a bidirectional clutch. This alternate clutch is capable of coupling a device in either a clockwise or counter-clockwise rotation.

The electronic control of the various embodiment of the present invention is governed by a microprocessor based system such as the one disclosed in U.S. patent application Ser. No. 08/431,148. The electronic control unit measures the rotation of helical gear 1059 through a feedback disk acting in conjunction with four electrical contactors riding therealong.

Figure 23:
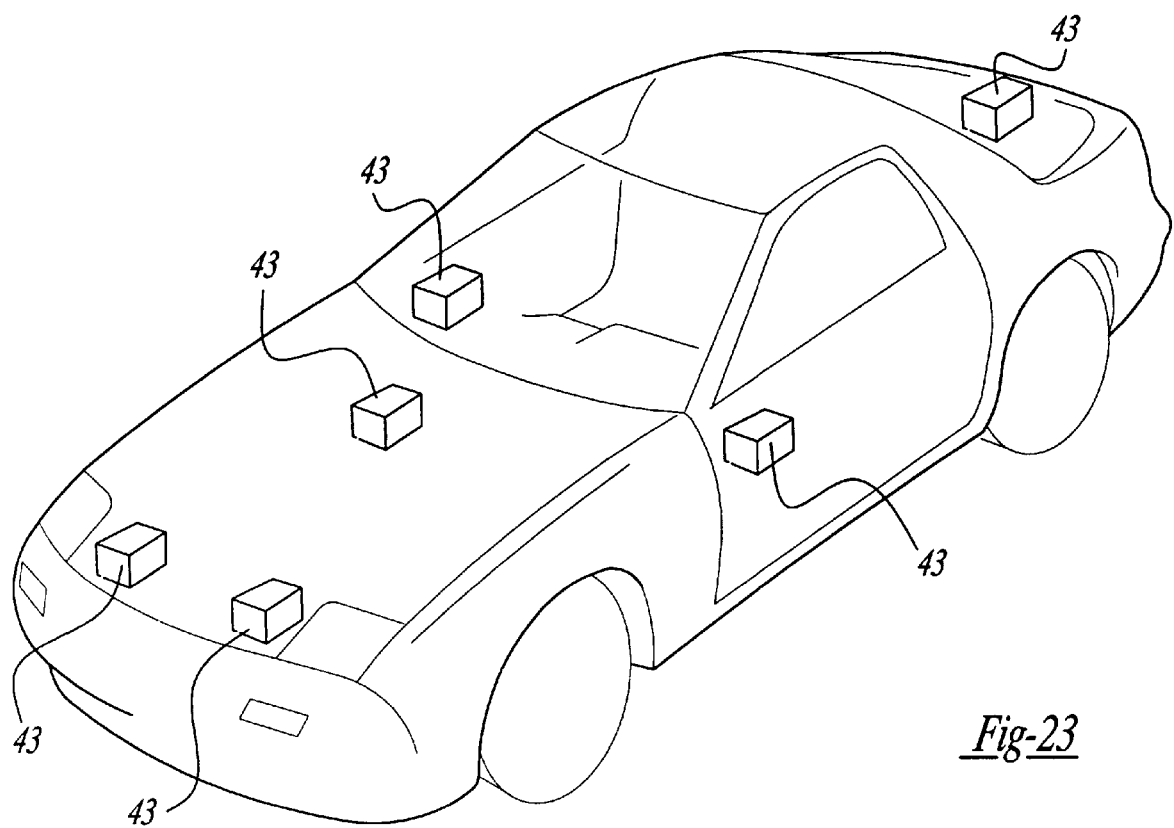
FIG. 23 is a perspective view of an automotive vehicle equipped with a plurality of the various embodiments of the multi-functional apparatus of the present invention.

FIG. 23 is a perspective view of an automotive vehicle equipped with a plurality of the present invention. Central drive and power transmission units 43 are placed proximately to the various vehicle systems that require actuation. For example, unit 43 is placed proximately to one headlight, at the front wiper system, within the doors and/or at the rear hatch. This location will allow units 43 to drive the various remote and independent vehicle systems. It should be noted that placement of the units 43 will vary according to the optimal packaging space needs of the specific automotive vehicle.

While various embodiments of this multi-functional apparatus have been disclosed, it will be appreciated that various modifications may be made without departing from the present invention. For example, a solenoid electromagnet or other electromagnetic devices may be used in place of the previously described electric motor. Multiple combinations of the vehicle systems may also be used. A central power transmission unit may have any combination of two or more of above recited linkages and motion transmitting mechanisms connecting to two or more vehicle systems. Furthermore, additional spur gears, pinion gears, sector gears, planetary gears, jack screws, sprockets, and chains, pulleys and belts, cables or other force transmitting means may be employed to couple between the electromagnetic device, rotatable member, intermittent motion mechanisms or locks. Moreover, a multiple gear transmission, linkage, belt or cable system can alternately couple a wiper assembly to a wiper shaft. It will further be appreciated that a variety of other multiplexed or non-multiplexed, microprocessor or analog circuitry may be used to control the apparatus of the present invention. The clutch mechanism can also be carried out in a variety of other constructions such as with Belleville springs, diaphragm springs, friction plates, sector gears, linkages or the like. The clutch mechanism may also be used on all motion transmitting mechanisms and linkages recited above to decouple the various vehicle systems. The intermittent motion mechanisms may also be accomplished by employing other known intermittent motion mechanisms such as more conventional Geneva mechanisms, intermittent gearing, escapements, ratchet mechanisms or other known selectively actuable devices. Various other materials, electronic components, circuits and force transmitting devices may also be used. It is intended by the following claims to cover these and any other departures from the disclosed embodiments which fall within the true spirit of this invention.

The invention claimed is:

1. A multi-functional automotive vehicle apparatus for use in an automotive vehicle, said apparatus comprising:
   a window regulator driving device;
   a lock linkage movable between a locked orientation and an unlocked orientation; and
   a single electromagnetic device actuable to selectively operate said window regulator driving device and said lock linkage, said electromagnetic device being stationarily mounted to the vehicle during actuation of said lock linkage.

2. A multi-functional automotive vehicle apparatus comprising:
   a vehicle mirror adjustment device movable between a first orientation and a second orientation;
   a lock linkage movable between a locked orientation and an unlocked orientation;
   a single electromagnetic device actuable to selectively operate said mirror adjustment device and said lock linkage.

3. The multi-functional automotive vehicle apparatus of claim 2 further comprising a Geneva-type mechanism selectively coupling said electromagnetic device to at least one of said mirror adjustment device and said lock linkage.

4. The multi-functional automotive vehicle apparatus of claim 2 further comprising a star wheel-type mechanism selectively coupling said electromagnetic device to at least one of said mirror adjustment device and said lock linkage.

5. The multi-functional automotive vehicle apparatus of claim 2 further comprising a slotted cam selectively coupling said electromagnetic device to at least one of said mirror adjustment device and said lock linkage.

6. The multi-functional automotive vehicle apparatus of claim 2 further comprising a clutch assembly selectively coupling said electromagnetic device to at least one of said mirror adjustment device and said lock linkage.

7. A multi-functional automotive vehicle apparatus comprising:
   a rotatable member;
   a single electromagnetic device operable to selectively rotate said rotatable member;
   a first motion transmitting member selectively moved in response to rotation of said rotatable member;
   a first mechanism located adjacent to a front portion of said automotive vehicle, said first mechanism operably moving in response to movement of said first motion transmitting member;
   a second motion transmitting member selectively moved in response to rotation of said rotatable member; and
   a vehicle windshield wiper assembly coupled to said second motion transmitting member for operation of said wiper assembly.

8. The multi-functional automotive vehicle apparatus of claim 7 wherein said first motion transmitting member is a Geneva-type mechanism.

9. The multi-functional automotive vehicle apparatus of claim 7 wherein said first motion transmitting member is a star wheel-type mechanism.

10. The multi-functional automotive vehicle apparatus of claim 7 wherein at least one of the first and second motion transmitting members is linearly movable in response to selective rotation of said rotatable member.

11. The multi-functional automotive vehicle apparatus of claim 7 further comprising a lock linkage for locking and unlocking a vehicle panel.

12. The multi-functional automotive vehicle apparatus of claim 7 wherein at least one of said motion transmitting members is a clutch mechanism.

13. The multi-functional automotive vehicle apparatus of claim 7 wherein said first mechanism is a vehicle washer fluid pump coupled to said first motion transmitting member, a portion of said pump operated upon selective movement of said first motion transmitting member.

14. The multi-functional automotive vehicle apparatus of claim 7 wherein said first mechanism is a headlamp mechanism movable between an operable orientation and a retracted orientation.

15. The multi-functional automotive vehicle apparatus of claim 7 wherein said first mechanism is a vehicle hood latch release mechanism.

16. A multi-functional automotive vehicle apparatus comprising:
   a single electromagnetic device;
   a first intermittent motion transmitting member selectively movable in response to energization of said single electromagnetic device;
   a second intermittent motion transmitting member selectively movable in response to energization of said single electromagnetic device, wherein at least one of said intermittent motion transmitting members includes at least one of the following members taken essentially from the group of: (a) a Geneva-type mechanism, (b) a starwheel-type mechanism, (c) a slotted cam, and (d) a clutch assembly; and
   a window regulator coupled to said first intermittent motion transmitting member.

17. The multi-functional automotive vehicle apparatus of claim 16 further comprising a door lock mechanism movably coupled to said second intermittent motion transmitting member.

18. The multi-functional automotive vehicle apparatus of claim 16 further comprising a mirror adjusting mechanism movably coupled to said second intermittent motion transmitting member.

19. A multi-functional automotive vehicle apparatus comprising:
   a single electromagnetic device;
   a first mechanism located adjacent to a headlamp and being movable from a first orientation to a second orientation; and
   a hood latch release mechanism movable from a first orientation to a second orientation;
   said single electromagnetic device selectively moving said first mechanism and said hood latch release mechanism between said respective orientations.

20. The multi-functional automotive vehicle apparatus of claim 19 wherein said first mechanism is a headlamp wiper assembly.

21. The multi-functional automotive vehicle apparatus of claim 19 wherein said first mechanism is a headlamp washer fluid pump.

22. The multi-functional automotive vehicle apparatus of claim 19 wherein said first mechanism is a headlamp mounting bracket.

23. A multi-functional automotive vehicle apparatus comprising:

an electromagnetic device;

a rotatable member having a driving interface, said electromagnetic device operably moving said rotatable member;

a first intermittent motion mechanism selectively engagable with said driving interface;

a second intermittent motion mechanism selectively engagable with said driving interface; and a third intermittent motion mechanism selectively engagable with said driving interface.

24. The multi-functional automotive vehicle apparatus of claim 23 further comprising a single, direct current, electric motor operably rotating said rotatable member which is a gear.

25. The multi-functional automotive vehicle apparatus of claim 24 wherein at least one of said intermittent motion mechanisms causes linear movement.

26. The multi-functional automotive vehicle apparatus of claim 25 wherein said at least one of said intermittent motion mechanisms is a jack screw.

27. The multi-functional automotive vehicle apparatus of claim 24 wherein at least one of said intermittent motion mechanisms causes rotary movement.

28. The multi-functional automotive vehicle apparatus of claim 23 wherein said first intermittent motion transmitting member is a Geneva-type mechanism.

29. The multi-functional automotive vehicle apparatus of claim 23 wherein said first intermittent motion transmitting member is a star wheel-type mechanism.

30. The multi-functional automotive vehicle apparatus of claim 23 wherein said first intermittent motion transmitting member is a slotted cam.

31. The multi-functional automotive vehicle apparatus of claim 23 wherein said first intermittent motion transmitting member is a clutch assembly.

32. The multi-functional automotive vehicle apparatus of claim 2 further comprising an intermittent motion mechanism coupling said electromagnetic device to said mirror adjustment device, a housing of said electromagnetic device being stationarily affixed to the vehicle.

* * * * *